(12) United States Patent
Ariesen

(10) Patent No.: US 12,374,811 B2
(45) Date of Patent: Jul. 29, 2025

(54) CABLE TAP

(71) Applicant: TECHNETIX B.V., Veenendaal (NL)

(72) Inventor: Jan Ariesen, Veenendaal (NL)

(73) Assignee: TECHNETIX B.V., Veenendaal (NL)

( * ) Notice: Subject to any disclaimer, the term of this patent is extended or adjusted under 35 U.S.C. 154(b) by 389 days.

(21) Appl. No.: 17/942,319

(22) Filed: Sep. 12, 2022

(65) Prior Publication Data

US 2023/0098819 A1 Mar. 30, 2023

(30) Foreign Application Priority Data

Sep. 27, 2021 (GB) ...................... 2113752

(51) Int. Cl.
  *H01R 9/05* (2006.01)
  *H01R 13/64* (2006.01)
  *H01R 103/00* (2006.01)

(52) U.S. Cl.
  CPC ........... *H01R 9/0509* (2013.01); *H01R 13/64* (2013.01); *H01R 2103/00* (2013.01)

(58) Field of Classification Search
  CPC .............................. H01R 9/0509; H01R 13/64
  USPC ........................................................ 439/394
  See application file for complete search history.

(56) References Cited

U.S. PATENT DOCUMENTS

| | | | |
|---|---|---|---|
| 4,812,779 A | 3/1989 | Wagner | |
| 5,245,420 A | 9/1993 | Harney et al. | |
| 5,345,504 A | 9/1994 | West, Jr. | |
| 2014/0380399 A1 | 12/2014 | Zilberberg | |

FOREIGN PATENT DOCUMENTS

WO  WO-9727550 A2 *  9/1997  .............  G06F 17/14

\* cited by examiner

*Primary Examiner* — Gary F Paumen
(74) *Attorney, Agent, or Firm* — SZDC Law PC

(57) ABSTRACT

There is provided a cable tap (36) comprising an input (38) and an output (40), a first signal path (37) connected between the input (38) and the output (40), and a splitter element (26) providing a plurality of tap ports (24), wherein a second signal path (43) is connected between the splitter element (26) and the first signal path (37) and signal processing element (42) is disposed in the second signal path (43), the signal processing element (42) configured to measure and adjust characteristics of a signal passing between the splitter element (26) and the first signal path (37) so as to ensure each tap port remains at a required signal level. The signal processing element (42) comprises a gain control element (44) acting on at least one level attenuator (46) and at least one equalizer (50).

8 Claims, 2 Drawing Sheets

CABLE TAP

This application claims priority to United Kingdom Patent Application No. GB 2113752.6, filed on Sep. 27, 2021, which is incorporated by reference for all purposes as if fully set forth herein.

FIELD OF THE INVENTION

This invention relates to a cable tap for use in a communications network, such as a cable television (CATV) or broadband network.

BACKGROUND TO THE INVENTION

Cable networks require upgrading to create more bandwidth and data capacity, upgrading from a frequency of 862 MHz to 1.2 GHz and then to 1.8 GHz. Unfortunately signal levels used in a 862 MHz network will need changing for a 1.2 GHz network. These changed signal levels will create a challenge for the distribution network as cable tap values may have to change, particularly when upgrading to 1.8 GHz which will require an operator to change tap values and add amplifiers as the signal loss in the network is increased so as to ensure the Total Composite Power is maximized. Such an upgrade requires replacement of existing cable taps and amplifiers, with the broadband connection disconnected for several hours while the rebuild necessary for such an upgrade takes place.

SUMMARY OF THE INVENTION

In accordance with the invention, there is provided a cable tap comprising an input and an output, a first signal path connected between the input and the output, and a splitter element providing a plurality of tap ports, wherein a second signal path is connected between the splitter element and the first signal path and signal processing means or element is disposed in the second signal path, the signal processing means configured to measure and adjust characteristics of a signal passing between the splitter element and the first signal path. This allows for signal power levels to be adjusted without the need to alter tap values of a cable tap.

Preferably the signal processing means is configured to measure and adjust signal level, representing signal power, of the signal passing between the splitter element and the first signal path so as to ensure each tap port remains at a required signal level.

The input and the output are preferably connectable to a communications network, typically by being connectable to a coaxial cable or coax line, with the tap ports connectable to users of such a network, for example a broadband network or a CATV network.

The signal processing means may comprise a gain control element.

The signal processing means may comprise at least one level attenuator element and at least one equalizer element, with preferably the gain control element acting on the at least one level attenuator element and at least one equalizer element to alter the signal level.

The signal processing means may comprise separate third and fourth signal paths for separately conveying upstream and downstream signals and desirably in such an arrangement the gain control element is configured to alter the signal characteristics, and in particular signal level, of both downstream and upstream signals in the third and fourth signal paths.

Preferably at least one level attenuator element and at least one equalizer element are disposed in each of the third and fourth signal paths.

An amplifier element may be disposed in each of the third and fourth paths, and as such there is preferably a downstream amplifier element and an upstream amplifier element.

Preferably the gain control element is configured to detect the signal output of the downstream amplifier element positioned in the third signal path and configured to control both the upstream and downstream signal levels based on the detected signal output from the downstream amplifier element.

The cable tap may be an outdoor tap.

The invention will now be described by way of example with reference to the accompanying drawings in which.

DESCRIPTION

Figure 1:
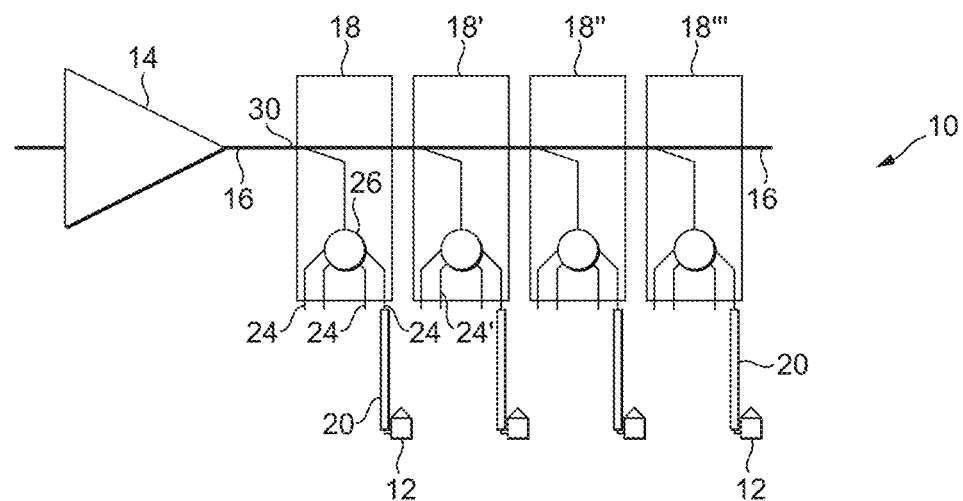
FIG. 1 shows a schematic diagram of part of a CATV or broadband network.

Part of a cable distribution network 10 is shown in FIG. 1 where a plurality of user households 12 are connected to the CATV or broadband network 10 with downstream signals passing from a provider at a headend to reach the user and upstream signals passing from each user to the headend. Signals passing through amplifier 14 are distributed to users 12 by way of coaxial cable or coax line 16, outdoor taps 18, 18', 18'', 18''' and drop cables 20. The signals passing along coax line 16 will be at a high initial power level for the first tap 18 but the signal power level or signal level will reduce over the length of coax line 16 as part of the signal is tapped off at successive outdoor taps 18, 18', 18'', 18''' to supply users through tap ports 24, 24'. Thus the signal entering tap 18 will be at a much higher power level than the signal that enters tap 18'''.

Each tap port throughout the network is required to provide an equal signal level into homes 12 and to achieve this taps 18, 18', 18'' and 18''' are generally set at different loss values to allow them to split off different amounts of signal. Thus for a network with 1.2 GHz signal, for example, the first tap after amplifier 14, tap 18, is set at a loss value of 29 dB and thus the loss of this tap from input connector 30 to tap ports 24 is 29 dB. So the signal on tap port 24 is 29 dB lower than the input signal at input 30, assuming no losses associated with splitter 26. If the input signal into the first tap 18 is 44 dBmV, the signal power level, otherwise known as signal level, at tap port 24 is 44−29=15 dBmV.

After tap 18, the majority of the signal continues to the second tap, tap 18', which is set at a tap value of 26 dB. The level of input signal to this second tap 18' is a few dBs lower than the input signal to the first tap 18. If the input signal of the second tap is at a signal level of 41 dBmV, then the signal on tap port 24' is at level 15 dBmV, i.e. 41−26=15 dBmV. Therefore the signal level on tap port 24' of second tap 18' is equal to the signal level on tap ports 24 of the first tap 18. The values of the remaining taps positioned along coax line 16 are similarly selected in view of the level of their input signal to ensure the signals on every tap port have the same signal level.

Each time a network is upgraded to increase the bandwidth, the input signal level to each tap will change and the tap values will need to be altered to ensure each tap port has the same signal level as the other tap ports.

Figure 2:
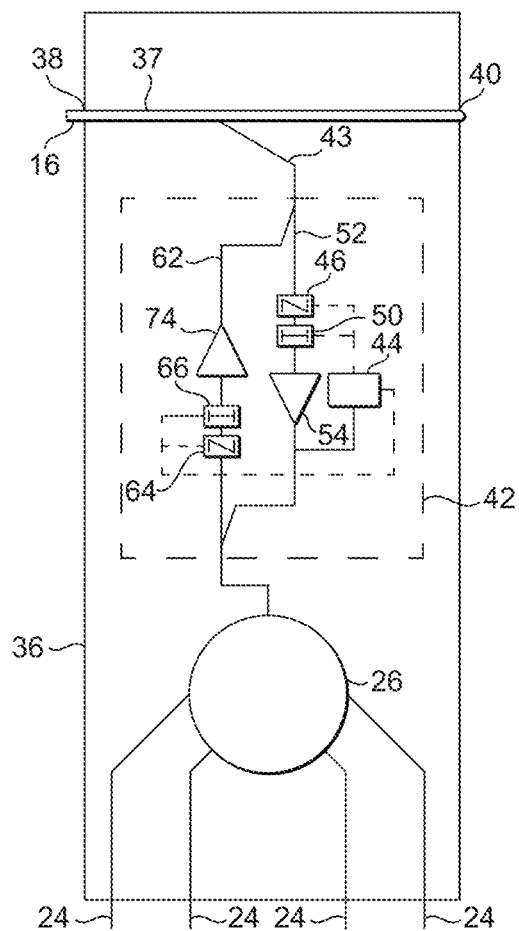
FIG. 2 shows a schematic diagram of a cable tap in accordance with the invention.

A tap 36 in accordance with the present invention is shown in FIG. 2 with coax line 16 providing or connecting to a through signal path 37 passing between input 38 and output 40. A signal processing element 42 is connected within signal path 43 between main coax line 16 and splitter 26, splitter 26 supplying signals to a plurality of tap ports 24. Signal processing element 42 is configured to modify signal characteristics, and in particular signal levels, of signals passing from line 16 to tap ports 24 so that the tap value does not need to be adjusted when the network is upgraded to a different bandwidth.

Signal processing element 42 comprises automatic gain control circuit 44 which measures the signal, calculates the required output level of tap port 24 and then adjusts the signal using level attenuator 46 and equalizer 50 so as to ensure the signal level at tap port 24 is correct.

Desirably the upstream and downstream signals between line 16 and splitter 26 are separated into separate paths within signal processing element 42 to allow for amplification and separate level adjustment of the upstream and downstream signals. Thus in FIG. 2, downstream path 52 comprises level attenuator 46, equalizer 50 and downstream amplifier element 54 connected in series, with the output of amplifier 54 connected to splitter 26. Gain control circuit 44 is connected in parallel with the elements amplifier 54, level attenuator 46 and equalizer 50. Circuit 44 measures the output level of amplifier 54, calculates the required output level of tap port 24 and then adjusts level control elements 46, 50 to alter the signal level at amplifier 54 and ensure the signal level of tap port 24 is correct.

Similarly upstream path 62 comprises a second level attenuator 64 and a second equalizer 66 connected in series with upstream amplifier element 74. Automatic gain control circuit 44 is also connected to level control elements 64, 66, such that a single gain control circuit 44 controls the signal characteristics, and more specifically the signal power otherwise known as signal level, of both the upstream and downstream signals within signal processing element 42. Circuit 44 calculates the required settings of the upstream signal based on the downstream signal settings calculated from the output of amplifier 54 and adjusts attenuator 64 and equalizer 66 to ensure the correct signal characteristics for the upstream signal leaving amplifier 74.

Signal processing element 42 ensures that regardless of the level of input signal to tap 36, the signals to and from ports 24 are maintained at the correct levels.

Figure 3:
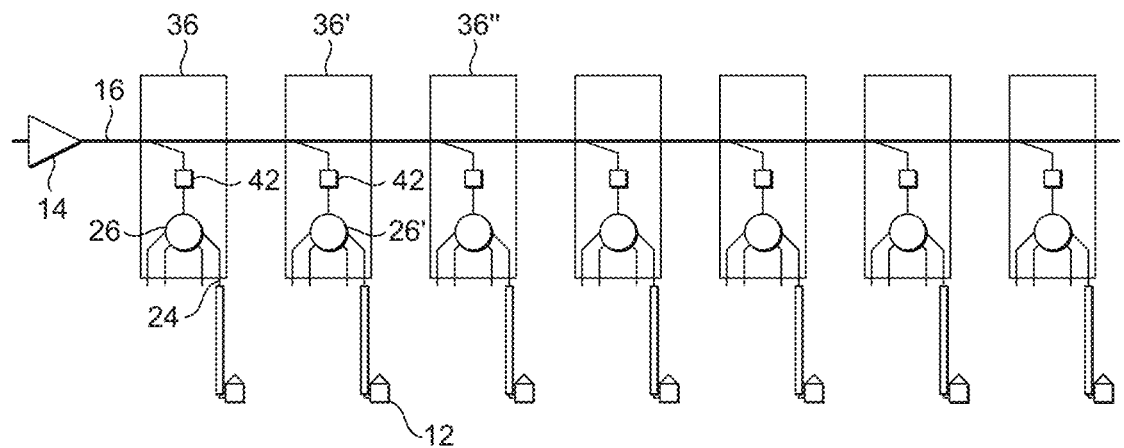
FIG. 3 shows a schematic diagram of part of a network using the cable tap of FIG. 2.

Part of a network using such modified taps 36, 36', 36" is shown in FIG. 3.

Figure 4:
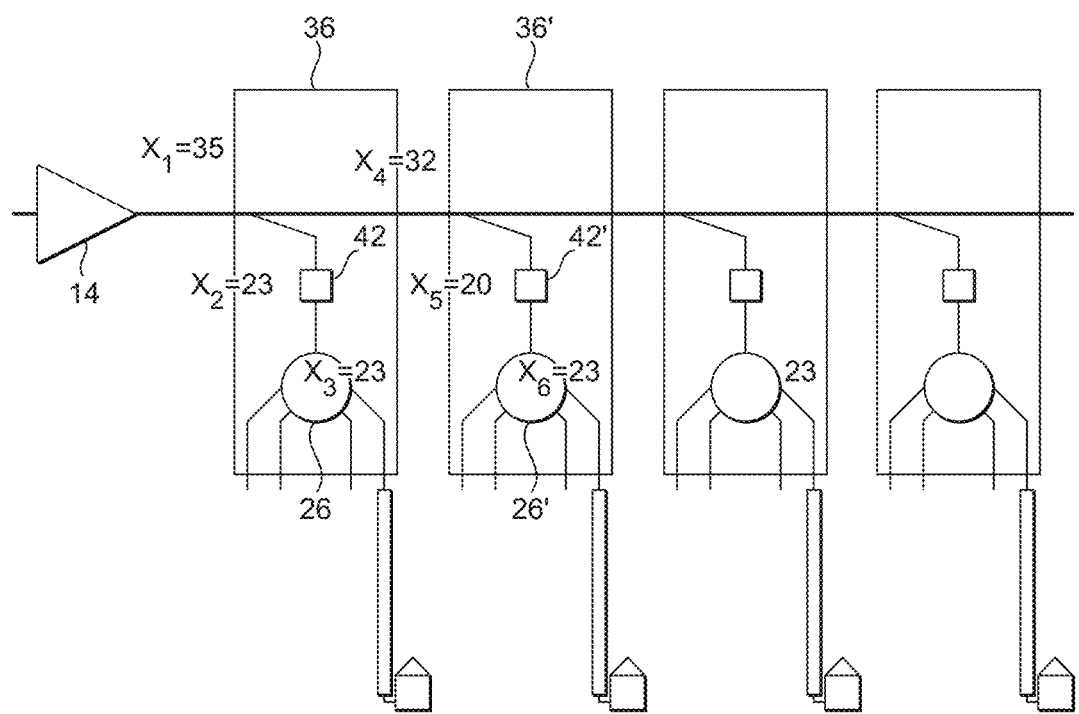
FIG. 4 shows a schematic diagram of part of a network to explain signal levels in such taps.

Operation of tap 36 for a network upgraded to 1.2 GHz will now be explained in more detail with reference to FIG. 4. In this network all taps are set to a tap value of 12 dB. A consistent tap port output level of 15 dBmV is required.

The 1.2 GHz signal into first tap 36 has a signal level of $x_1=35$ dBmV. Given tap 36 has a tap value of 12 dB, the input signal into signal processing element 42 is therefore 35−12 dB=23 dB=$x_2$. The signal $x_3$ on the input of splitter 26 needs to be 23 dB to generate a tap output port level of 15 dBmV, the splitter having a loss of 8 dB, and therefore gain control circuit 44 will act on attenuator 46 and equalizer 50 to align amplifier 54 to 0 dB gain as signal processing element 42 does not need to alter the signal level.

The input signal into second tap 36' has a level of $x_4=32$ dBmV. Given tap 36' has a tap value of 12 dB, the input signal into signal processing element 42' is therefore 32−12 dB=20 dB=$x_5$. The desired signal $x_6$ on the input of splitter 26' is 23 dBmV and therefore gain control circuit 44 will at to align the amplifier 54 to 3 dB gain to ensure $x_6$ is at the correct signal level.

This continues along line 16 and every tap delivers a 1.2 GHz signal on the tap port having a signal level or power of 15 dBmV. This 15 dBmV is an example signal level but shows that this network is able to create an ideal quality signal to drive high speed data through this network.

If the network is upgraded to 1.8 GHz, then to achieve a signal level of 0 dBmV into the home a signal of 19 dBmV is required at each tap port. Splitter 26 now has a loss of 9 dB, by way of example, and therefore a signal level of 28 dBmV is required into splitter 26.

Taking a 1.8 GHz signal into the first tap provides an input level of 36 dBmV. The signal level into gain control circuit 44 is 28 dBmV and as the wanted signal into the splitter is also 28 dBmV, gain control circuit 44 will act to align the amplifier 54 to 0 dB gain.

The 1.8 GHz signal into the second tap is 35 dBmV. The signal level into gain control circuit 44 is 23 dBmV and as the wanted signal level into the splitter is 28 dBmV, gain control circuit 44 will act to align amplifier 54 to 5 dB gain.

This continues along line 16 and every tap delivers a 1.8 GHz signal on the tap port of signal level 19 dBmV. This 19 dBmV is an example level but shows that this network is able to create an ideal quality signal to drive high speed data through this network.

Such an outdoor distribution tap will measure the input signals and adjust the output signals. This way the input signals can vary between a certain bandwidth while the output signals towards the homes stay at an agreed steady signal level. Thus with such a tap it is possible to create the required signal level on the tap port without needing to modify tap values or replace taps. A network can be built with one standard tap set at a fixed tap level with signal processing element 42 of each tap then adjusting signal levels as the network bandwidth changes, and allowing the signal level to be modified according to the position of the tap along coax line 16. This avoids having taps of different levels and having to replace components within the taps to cope with upgrades changing the network bandwidth.

The invention claimed is:

1. A cable tap comprising an input and an output, a first signal path connected between the input and the output, and a splitter element providing a plurality of tap ports, wherein a second signal path is connected between the splitter element and the first signal path and a signal processing element is disposed in the second signal path, the signal processing element configured to measure and adjust characteristics of a signal passing between the splitter element and the first signal path; and the signal processing element comprising a gain control element and separate third and fourth signal paths for separately conveying upstream and downstream signals, the gain control element configured to detect a signal output of a downstream amplifier positioned in the third signal path and configured to control both the upstream and downstream signal levels based on the detected signal output.

2. A cable tap according to claim 1, wherein the signal processing element is configured to measure and adjust signal level of the signal passing between the splitter element and the first signal path so as to ensure each tap port remains at a required signal level.

3. A cable tap according to claim 1, wherein the input and the output are connectable to a communications network.

4. A cable tap according to claim 1, wherein the signal processing element comprises at least one level attenuator element and at least one equalizer element.

5. A cable tap according to claim 1, wherein the gain control element is configured to alter signal characteristics of both downstream and upstream signals in the third and fourth signal paths.

6. A cable tap according to claim 5, wherein at least one level attenuator element and at least one equalizer element are disposed in each of the third and fourth signal paths.

7. A cable tap according to claim 1, wherein an amplifier element is disposed in the fourth path.

8. A cable tap according to claim 1 being an outdoor tap.

\* \* \* \* \*